(12) United States Patent
Mihara

(10) Patent No.: US 12,179,575 B1
(45) Date of Patent: Dec. 31, 2024

(54) VALVE DEVICE

(71) Applicant: PIOLAX, INC., Kanagawa (JP)

(72) Inventor: Kenta Mihara, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 0 days.

(21) Appl. No.: 18/274,120

(22) PCT Filed: Jan. 25, 2022

(86) PCT No.: PCT/JP2022/002665
§ 371 (c)(1),
(2) Date: Jul. 25, 2023

(87) PCT Pub. No.: WO2022/168676
PCT Pub. Date: Aug. 11, 2022

(30) Foreign Application Priority Data

Feb. 2, 2021 (JP) ................................. 2021-015185

(51) Int. Cl.
*B60K 15/035* (2006.01)
*F16K 31/20* (2006.01)
(Continued)

(52) U.S. Cl.
CPC ............ *B60K 15/035* (2013.01); *F16K 31/20* (2013.01); *B60K 15/03519* (2013.01);
(Continued)

(58) Field of Classification Search
CPC .......... F16K 31/20; F16K 31/22; F16K 33/00; F16K 24/042; B60K 15/035; B60K 15/03519; B60K 2015/03289
(Continued)

(56) References Cited

U.S. PATENT DOCUMENTS 5,172,714 A * 12/1992 Kobayashi ............ F16K 24/042
137/39
6,405,766 B1 * 6/2002 Benjey .................. F16K 24/044
141/303
(Continued)

FOREIGN PATENT DOCUMENTS

CN 203488288 U 3/2014
CN 108730583 A 11/2018
(Continued)

OTHER PUBLICATIONS

Apr. 5, 2022, International Search Opinion issued for related PCT Application No. PCT/JP2022/002665.
(Continued)

*Primary Examiner* — Minh Q Le
(74) *Attorney, Agent, or Firm* — Paratus Law Group, PLLC

(57) ABSTRACT

A valve device includes: a housing including a peripheral wall, a bottom wall, and a partition wall; and a float valve accommodated in a valve chamber to be able to ascend and descend, thereby opening and closing an opening portion. A slit extends continuously over the peripheral wall and the bottom wall, and a deflectable and deformable elastic piece is formed via the slit. The elastic piece has a free end on the bottom wall, and the free end is provided with a float valve support portion configured to support the float valve.

5 Claims, 11 Drawing Sheets

(51) Int. Cl.
*F16K 24/04* (2006.01)
*F16K 31/22* (2006.01)
*F16K 33/00* (2006.01)

(52) U.S. Cl.
CPC ............ *F16K 24/042* (2013.01); *F16K 31/22* (2013.01); *F16K 33/00* (2013.01)

(58) Field of Classification Search
USPC ........ 137/409, 202, 433, 430, 436, 429, 388
See application file for complete search history.

(56) References Cited

U.S. PATENT DOCUMENTS

| | | | |
|---|---|---|---|
| 6,688,330 B1 | 2/2004 | Ehrman et al. | |
| 11,774,003 B2* | 10/2023 | Stephan | F16K 31/20 141/302 |
| 2001/0011538 A1* | 8/2001 | Crary | F02M 37/103 137/202 |
| 2004/0261846 A1* | 12/2004 | Matsuo | F16K 24/042 137/202 |
| 2005/0284875 A1* | 12/2005 | Kito | F16K 24/042 220/745 |
| 2009/0071543 A1* | 3/2009 | Vulkan | F16K 24/042 137/15.26 |
| 2009/0178719 A1* | 7/2009 | Matsuo | F16K 31/22 137/409 |
| 2013/0133758 A1* | 5/2013 | Ko | F16K 24/044 137/202 |
| 2015/0034174 A1 | 2/2015 | Sui | |
| 2015/0252760 A1* | 9/2015 | Mihara | F02M 37/20 137/202 |
| 2017/0138316 A1* | 5/2017 | Wada | F02M 37/0082 |
| 2017/0138499 A1* | 5/2017 | Wada | F16K 15/021 |
| 2018/0043766 A1* | 2/2018 | Wada | F16K 31/22 |
| 2020/0031221 A1* | 1/2020 | Sui | B60K 15/03519 |
| 2021/0024347 A1* | 1/2021 | Iino | B60K 15/03519 |
| 2023/0018794 A1* | 1/2023 | Yajima | F16K 24/044 |
| 2023/0191903 A1* | 6/2023 | Yajima | F16K 1/36 137/398 |
| 2023/0249543 A1* | 8/2023 | Yajima | F02M 37/0082 137/202 |
| 2023/0417336 A1* | 12/2023 | Kankaria | F16K 29/00 |
| 2024/0001759 A1* | 1/2024 | Mihara | B60K 15/035 |
| 2024/0100939 A1* | 3/2024 | Sakai | F02M 37/00 |
| 2024/0255065 A1* | 8/2024 | Kon | F02M 37/0029 |

FOREIGN PATENT DOCUMENTS

| | | |
|---|---|---|
| JP | H07-035255 A | 2/1995 |
| JP | 2003-505654 A | 2/2003 |
| JP | 6113146 B2 | 4/2017 |
| WO | WO 2013/141220 A1 | 9/2013 |

OTHER PUBLICATIONS

Apr. 5, 2022, International Search Report issued for related PCT Application No. PCT/JP2022/002665.

* cited by examiner

VALVE DEVICE

CROSS REFERENCE TO PRIOR APPLICATION

This application is a National Stage Patent Application of PCT International Patent Application No. PCT/JP2022/002665 (filed on Jan. 25, 2022) under 35 U.S.C. § 371, which claims priority to Japanese Patent Application No. 2021-015185 (filed on Feb. 2, 2021), which are all hereby incorporated by reference in their entirety.

TECHNICAL FIELD

The present invention relates to a valve device, and more particularly to a valve device attached to a fuel tank of an automatic vehicle or the like and including a float valve.

BACKGROUND ART

For example, a fuel tank of a vehicle such as an automatic vehicle is provided with a valve device (cut valve) that suppresses fuel in the fuel tank from leaking to the outside of the fuel tank, or a valve device (overfilling suppression valve) that suppresses overfilling into the fuel tank so that a fuel level in the fuel tank does not ascend above a preset full-tank fuel level when the automatic vehicle turns or tilts.

Such a valve device generally includes a housing and a float valve, and in the housing, a ventilation chamber is formed at an upper side and a valve chamber is formed at a lower side by a partition wall having a vent hole, and the float valve is arranged in the valve chamber to be able to ascend and descend. However, since the float valve abuts against a bottom surface of the housing at the time of descending from an ascended state, an impact sound is generated. In order to suppress the impact sound, there is a valve device provided with an elastic piece that abuts against the float valve at the bottom surface of the housing when the float valve descends.

For example, the following Patent Literature 1 describes a valve device for a fuel tank, which includes a case including a vent valve port communicating with the outside of a tank and a fuel inlet, and a float body disposed to ascend and descend in the case, and in which an elastic piece is formed by a first arc-shaped split groove and a second arc-shaped split groove on a surface portion of the case facing a bottom portion of the float body, and a part of the elastic piece abuts against the bottom portion of the float body.

CITATION LIST

Patent Literature

Patent Literature 1: JP6113146B

SUMMARY OF INVENTION

Technical Problem

However, since a fluid such as air or fuel vapor in the fuel tank is blown up and flows into the valve chamber when fuel is filled into the fuel tank, the fluid may push up the float valve from a bottom surface side to raise the float valve.

In the fuel tank device of Patent Literature 1, the first arc-shaped split groove and the second arc-shaped split groove are formed in the surface portion of the case facing the bottom portion of the float body, and an opening area is large. Therefore, there are inconveniences that at the time of fuel filling, a fluid such as air is likely to pass through the first and second arc-shaped split grooves, and the float body is likely to float.

Therefore, an object of the present invention is to provide a valve device which can suppress an impact sound generated when a float valve descends and in which the float valve is less likely to float.

Solution to Problem

In order to achieve the above object, a valve device according to the present invention includes: a housing including a peripheral wall, a bottom wall, and a partition wall, in which a valve chamber configured to communicate with an inside of a fuel tank is provided at a lower side and a ventilation chamber configured to communicate with an outside of the fuel tank is provided at an upper side via the partition wall, and an opening portion configured to communicate with the valve chamber and the ventilation chamber is formed in the partition wall; and a float valve accommodated in the valve chamber to be able to ascend and descend, thereby opening and closing the opening portion. A slit extends continuously over the peripheral wall and the bottom wall, and a deflectable and deformable elastic piece is formed via the slit. The elastic piece has a free end on the bottom wall, and the free end is provided with a float valve support portion configured to support the float valve.

Advantageous Effects of Invention

According to the present invention, since the slit forming the elastic piece extends continuously over the peripheral wall and the bottom wall, even when the slit on the bottom wall side is shortened, the elastic piece can be formed to be long by elongating the slit on the peripheral wall side. Therefore, the elastic piece can be easily deflected and deformed, and the impact sound suppression effect by the float valve support portion when the float valve descends can be enhanced.

Since the slit on the bottom wall side can be shortened while the elastic piece is formed to be long, the opening area of the slit on the bottom wall side can be reduced. Therefore, since the fluid that blows up from the bottom wall side of the housing and pushes up the float valve from the bottom surface side is less likely to pass through the slit on the bottom wall side, it is possible to make the float valve less likely to float.

DESCRIPTION OF EMBODIMENTS (Embodiment of Valve Device)

Hereinafter, an embodiment of a valve device according to the present invention will be described % with reference to the drawings. In the following description, "fuel" means liquid fuel (including fuel droplets), and "fuel vapor" means evaporated fuel. A valve device 10 according to this embodiment is a valve device for a fuel tank, which is attached to the fuel tank of a vehicle such as an automatic vehicle.

Figure 1:
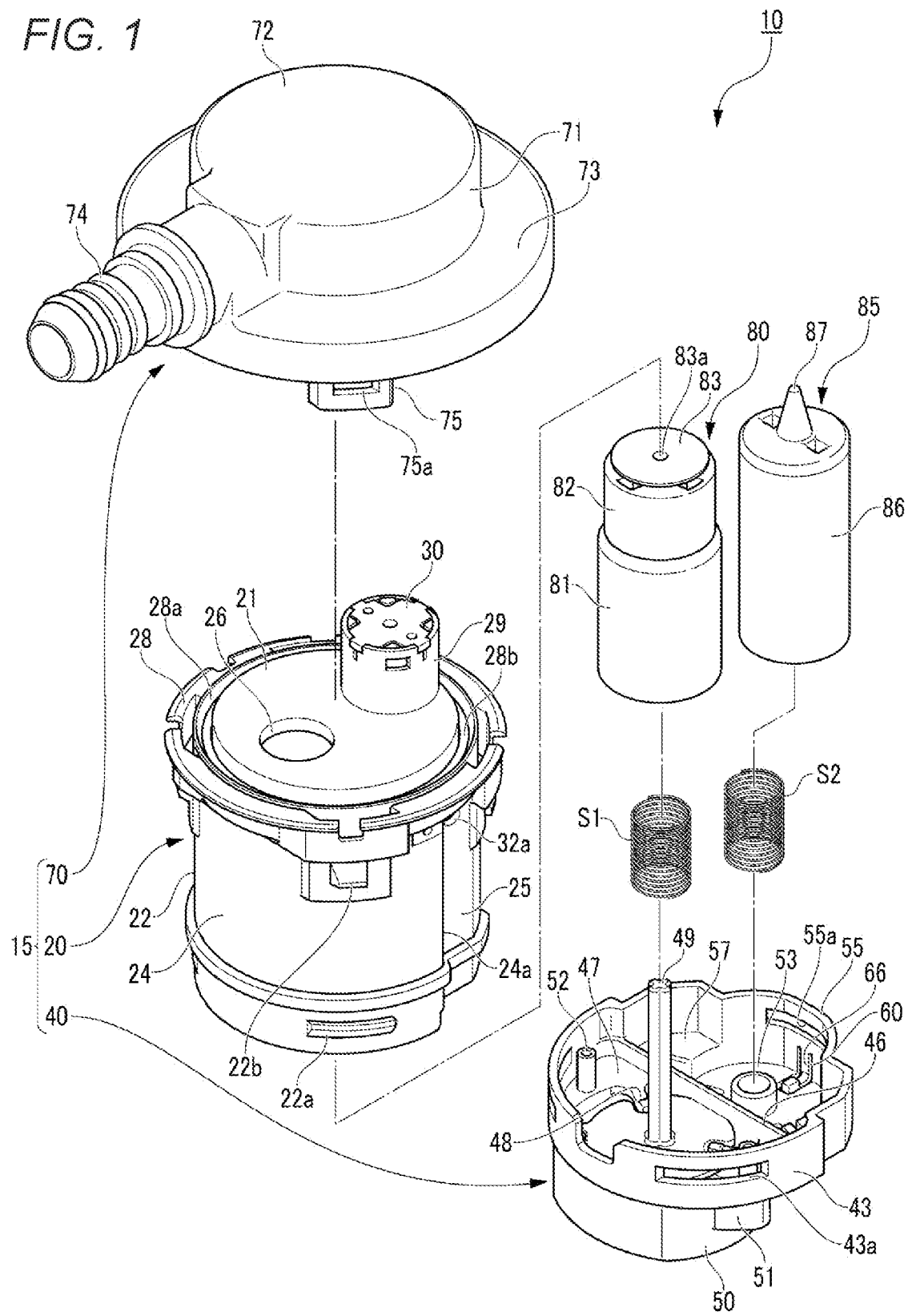
FIG. 1 is an exploded perspective view showing an embodiment of a valve device according to the present invention.
Figure 2:
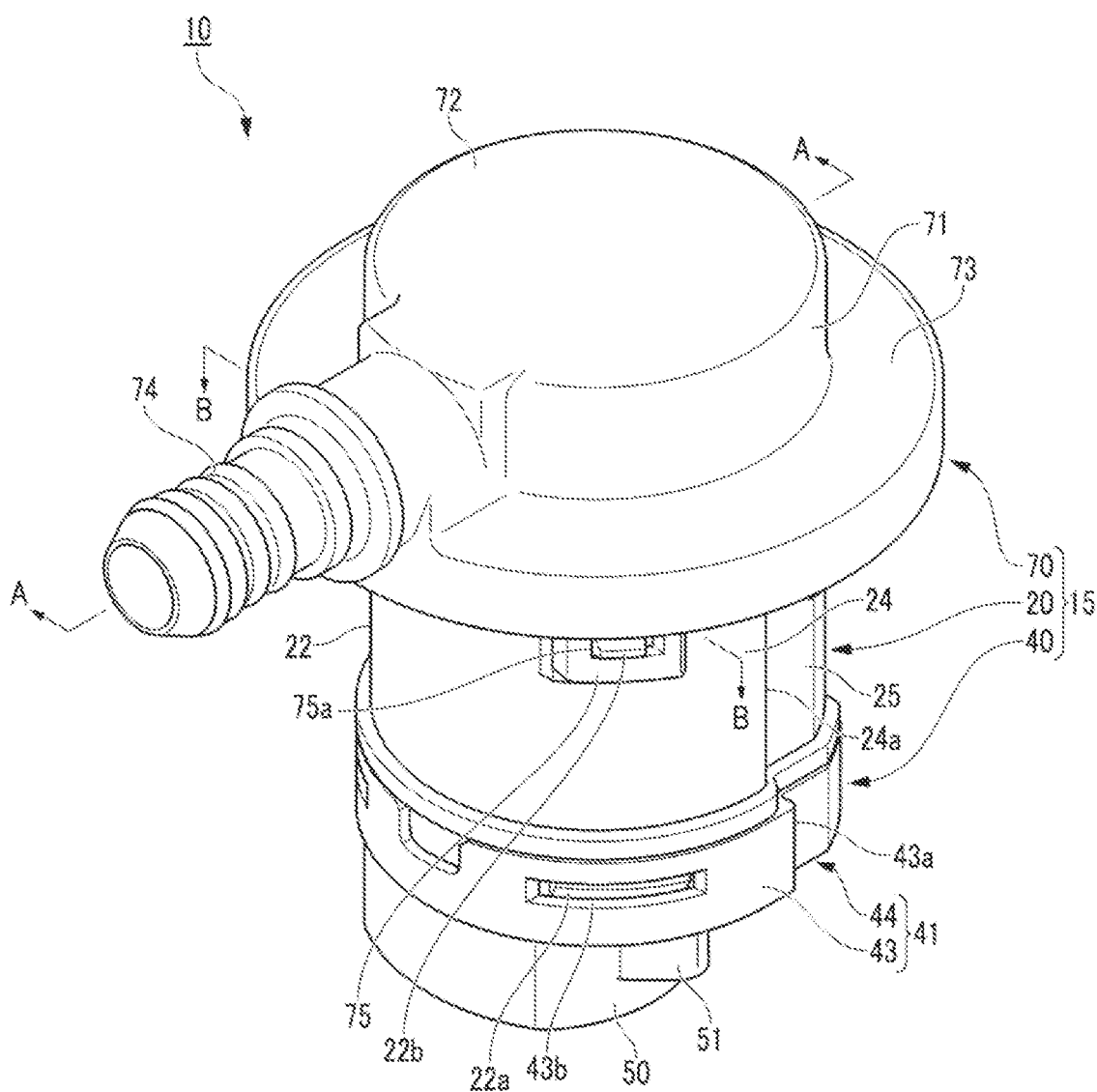
FIG. 2 is a perspective view of the valve device.
Figure 4:
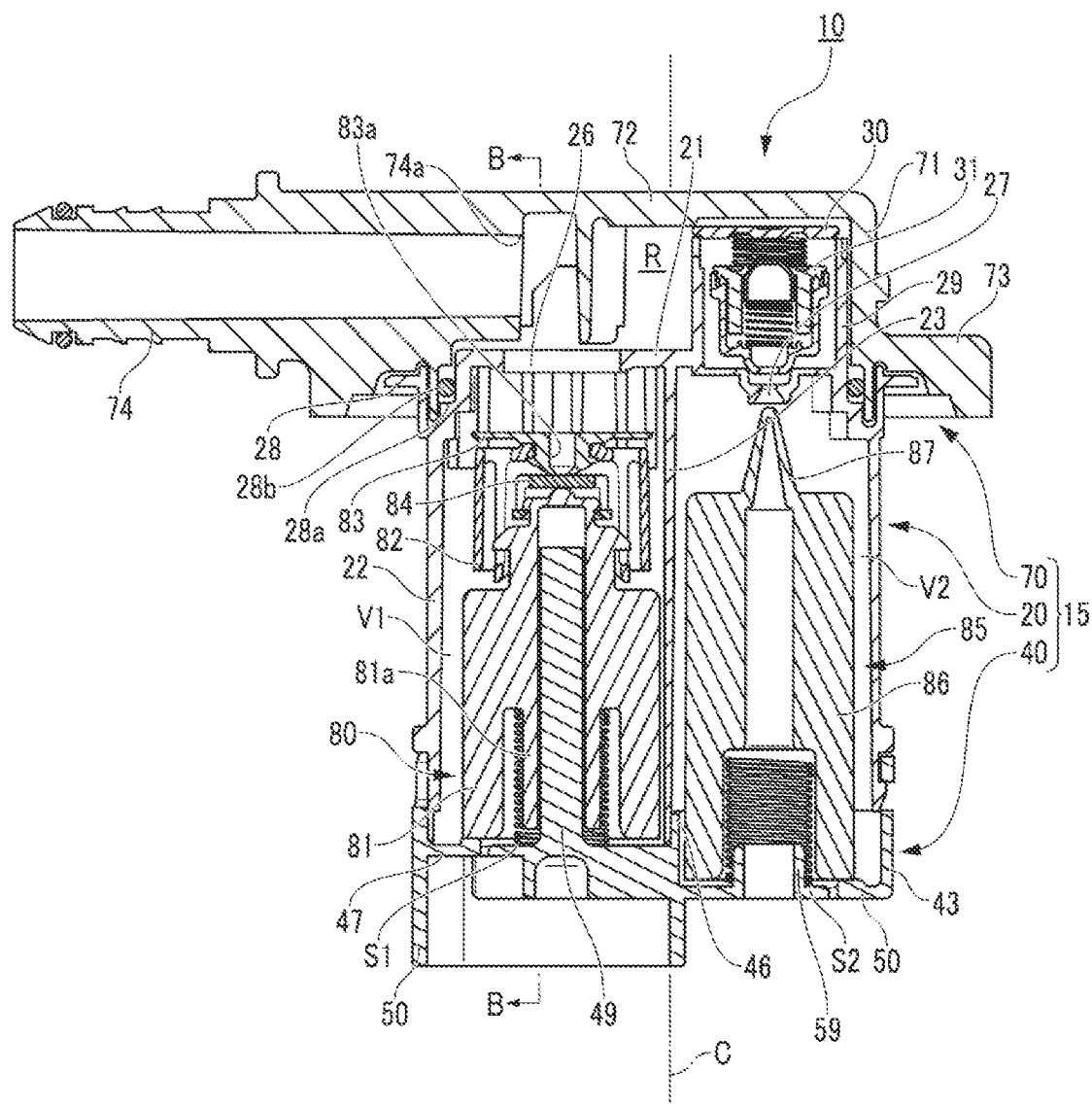
FIG. 4 is a cross-sectional view taken along a line A-A in FIG. 2.

As shown in FIGS. 1, 2, and 4, the valve device 10 according to this embodiment mainly includes: a housing 15 provided with a first valve chamber V1 and a second valve chamber V2 communicating with an inside of the fuel tank at a lower side and a ventilation chamber R communicating with an outside of the fuel tank at an upper side via a partition wall 21 formed with a first opening portion 26 and a second opening portion 27; a first float valve 80 accommodated in the first valve chamber V1 to be able to ascend and descend and configured to close the first opening portion 26 when a fuel level in the fuel tank reaches vicinity of a set full tank fuel level; a second float valve 85 accommodated in the second valve chamber V2 to be able to ascend and descend and configured to close the second opening portion 27 when a fuel level in the fuel tank ascended to a predetermined height or higher; a first biasing spring S1 configured to bias the first float valve 80; and a second biasing spring S2 configured to bias the second float valve 85. The second float valve 85 serves as a "float valve" according to the present invention.

The housing 15 according to this embodiment includes a housing main body 20, a lower cap 40 attached below the housing main body 20, and an upper cover 70 attached above the housing main body 20.

First, the housing main body 20 will be described with reference to FIGS. 1 to 4. The housing main body 20 has a substantially cylindrical shape with the partition wall 21 at an upper side and an opening at a lower side. The housing main body 20 includes a peripheral wall 22 and a partition wall 23 that defines an inner space of the housing main body 20 into the first valve chamber V1 and the second valve chamber V2 (see FIG. 4). The peripheral wall means a wall extending in an axial direction of the housing 15 (direction along an axial center C of the housing 15 as shown in FIG. 4) or extending in an ascending and descending direction of the float valves 80 and 85. The partition wall 21 is disposed above the peripheral wall 22. The peripheral wall 22 includes a first valve chamber forming wall 24 that forms an outer periphery of the first valve chamber V1, and a second valve chamber forming wall 25 that has a different outer shape from the first valve chamber forming wall 24 and forms an outer periphery of the second valve chamber V2 (see FIG. 2). In this embodiment, the first valve chamber forming wall 24 has a substantially semicircular shape, and the second valve chamber forming wall 25 has an irregular outer shape whose diameter is reduced from both ends of a semicircular portion of the first valve chamber forming wall 24 via a stepped portion 24a (see FIG. 2).

As shown in FIG. 1, a plurality of first engagement claws 22a protrude at a lower side of the peripheral wall 22, and a plurality of second engagement claws 22b protrude at an upper side of the peripheral wall 22.

The partition wall 21 is formed with an opening portion through which the valve chamber and the ventilation chamber R communicate with each other. In the case of this embodiment, the first opening portion 26 having a circular shape is formed at a predetermined position of the partition wall 21, and the first valve chamber V1 and the ventilation chamber R communicate with each other via the first opening portion 26 (see FIG. 4). As shown in FIG. 4, the second opening portion 27 having a smaller diameter than the first opening portion 26 is formed in the partition wall 21, and the second valve chamber V2 and the ventilation chamber R communicate with each other via the second opening portion 27.

A flange portion 28 projects from an upper outer periphery of the peripheral wall 22. A ring attachment groove 28a is formed inside the flange portion 28, and an annular seal ring 28b is attached to the ring attachment groove 28a.

A cylindrical wall 29 with an opened upper side protrudes from a peripheral edge of the second opening portion 27 on a front side of the partition wall 21. A cap 30 is attached to the upper opening of the cylindrical wall 29. As shown in FIG. 4, a pressure adjustment valve 31 is accommodated inside the components to be able to ascend and descend, whereby the pressure in the fuel tank can be adjusted.

Figure 9:
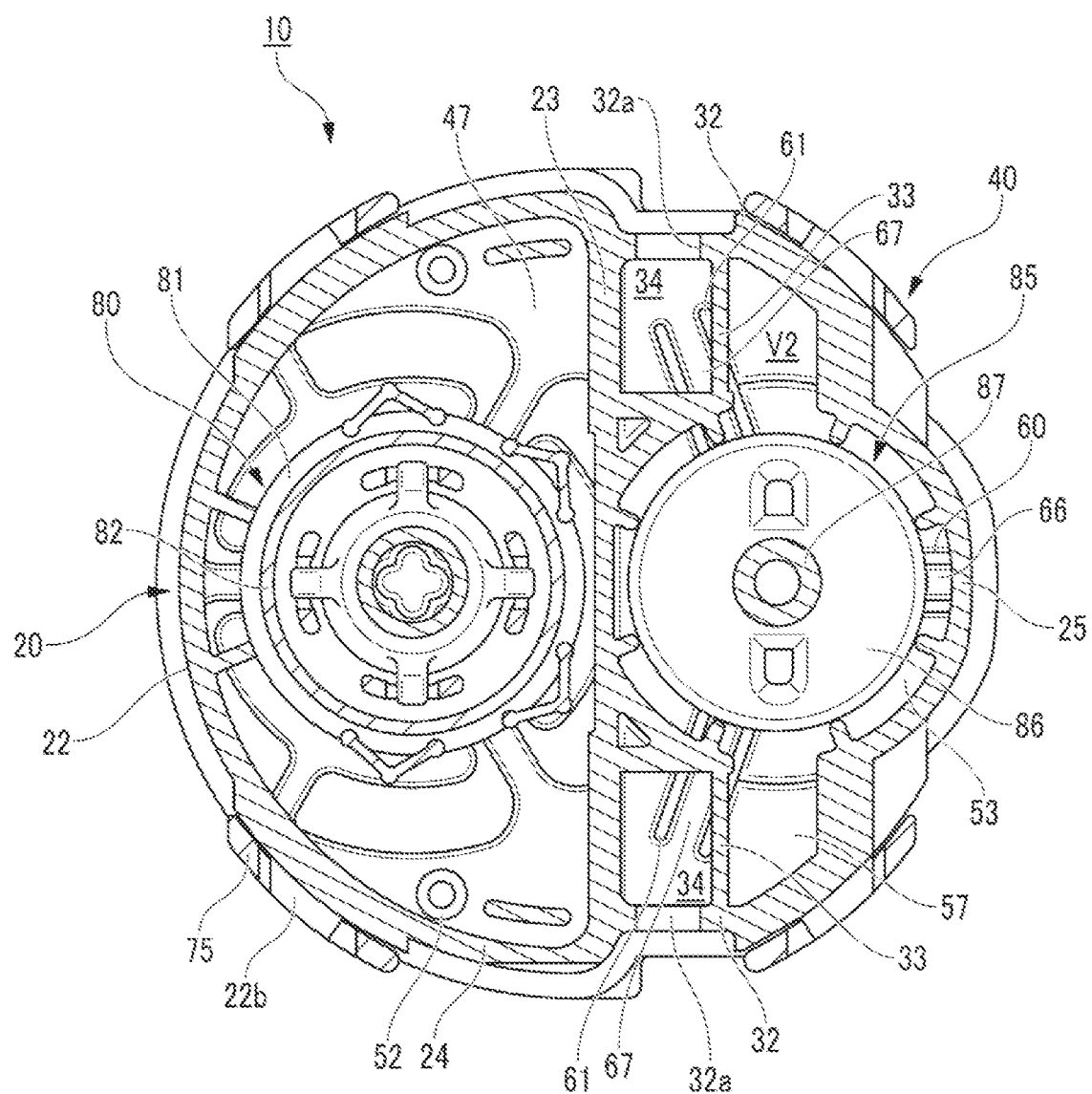
FIG. 9 is a cross-sectional view taken along a line B-B in FIG. 2.

As shown in FIG. 9, the second valve chamber forming wall 25 includes projecting wall portions 32 and 32 projecting outward in the radial direction of the second float valve 85 at positions adjacent to the both ends of the semicircular portion of the first valve chamber forming wall 24. An inner wall portion 33 having a substantially L-shaped frame shape when viewed in a cross section in the axial direction is formed inside each projecting wall portion 32. A flow path 34 through which a fluid such as gas (fuel vapor or air) or liquid flows is provided inside the wall portions 32 and 33. A through hole 32a communicating with the flow path 34 is formed at a predetermined position of the projecting wall portion 32.

Next, the lower cap 40 attached below the housing main body 20 will be described with reference to FIGS. 5 to 8.

Figure 5:
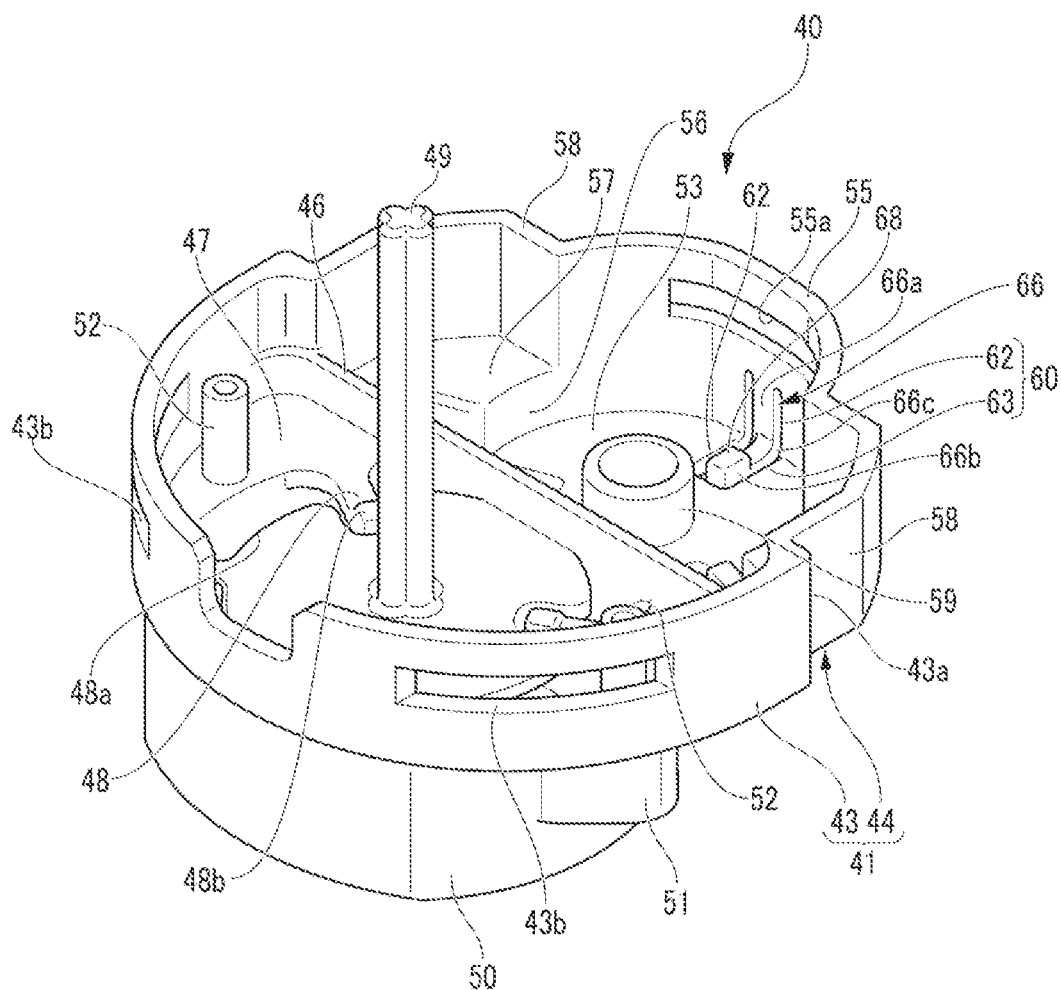
FIG. 5 is an enlarged perspective view of a lower cap constituting a housing of the valve device.
Figure 7:
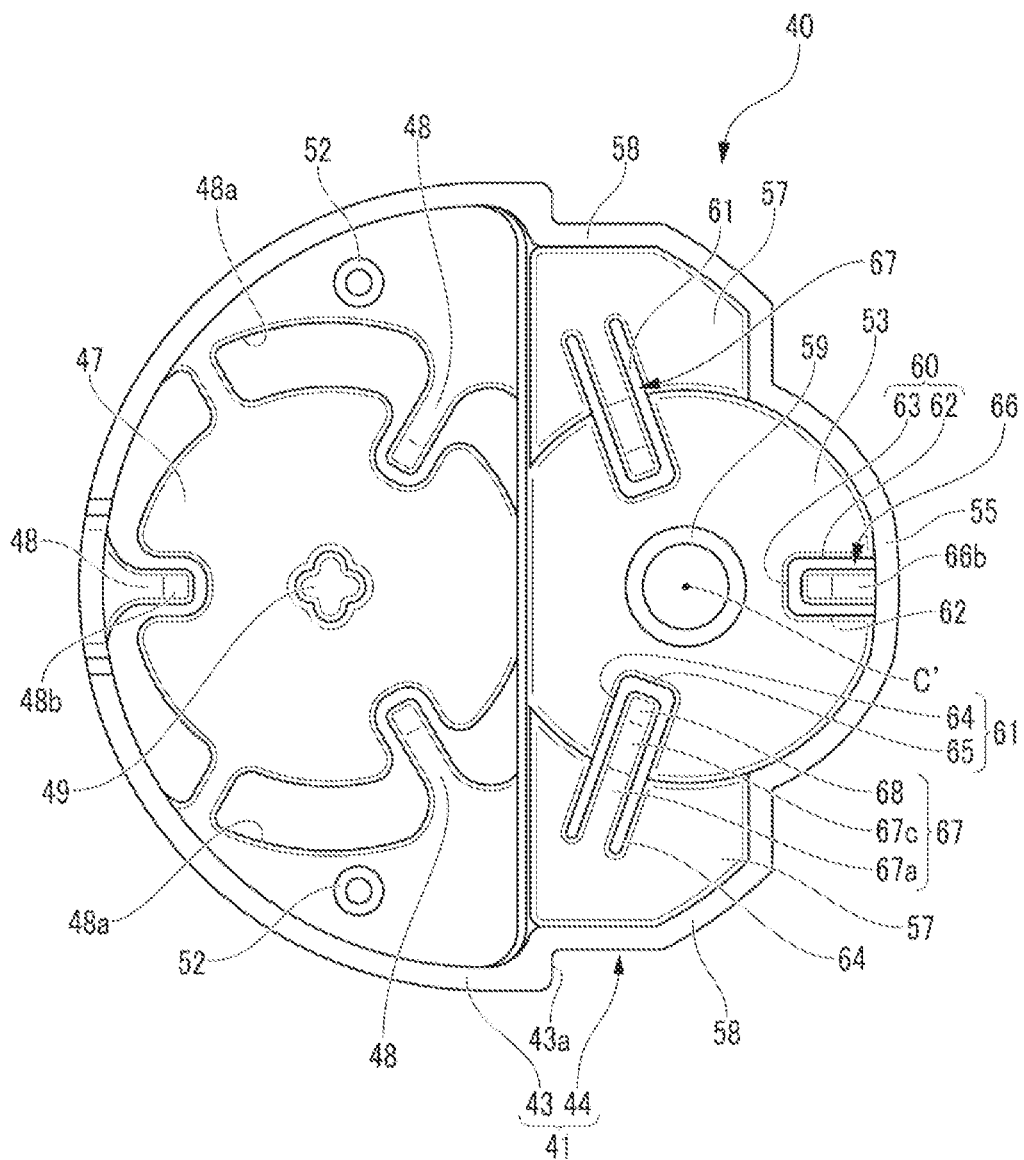
FIG. 7 is a plan view of the lower cap.

The lower cap 40 has a bottomed cap shape with an opening at an upper side and a bottom portion at a lower side. As shown in FIG. 5, the lower cap 40 includes a peripheral wall 41 having a shape conforming to the peripheral wall 22 of the housing main body 20. The peripheral wall 41 has a similar shape which is a size larger than the outer peripheral shape of the peripheral wall 22 of the housing main body 20, and is disposed at the outer periphery of the peripheral wall 22 of the housing main body 20 as shown in FIG. 2. The peripheral wall 41 includes a first peripheral wall 43 that forms the outer periphery of the first valve chamber V1, and a second peripheral wall 44 that has a different outer shape from the first peripheral wall 43 and forms the outer periphery of the second valve chamber V2. As shown in FIG. 7, the first peripheral wall 43 has a substantially semicircular shape, and the second peripheral wall 44 has an irregular outer shape whose diameter is reduced from both ends of the semicircular portion of the first peripheral wall 43 via a stepped portion 43a.

The bottom portion located below the peripheral wall 41 includes a first bottom wall 47 provided at a position facing a bottom surface of the first float valve 80, and a second bottom wall 53 provided at a position facing a bottom surface 85a of the second float valve 85. The bottom wall means a wall facing the bottom surface of the float valve. A pair of shelf-shaped walls 57 and 57 to be described later extend on both sides of the second bottom wall 53. A partition wall 46 that defines an internal space of the lower cap 40 into the first valve chamber V1 and the second valve chamber V2 is erected among the first bottom wall 47, the second bottom wall 53, and the pair of shelf-shaped walls 57 and 57. The partition wall 46 overlaps with a lower end portion of the partition wall 23 of the housing main body 20 when being attached below the housing main body 20 (see FIG. 4).

As shown in FIG. 5, a pair of notches 43b are formed in the outer periphery of the first peripheral wall 43, and a notch 55a is formed in the second peripheral wall 44. As shown in FIG. 2, the first engagement claws 22a of the housing main body 20 are engaged with the corresponding notches 43b and 55a of the lower cap 40, thereby attaching the lower cap 40 below the housing main body 20. As a result, the first valve chamber V1 and the second valve chamber V2 that communicate with the inside of the fuel tank (not shown) are formed below the housing via the partition wall 21 (see FIG. 4). The first valve chamber V1 and the second valve chamber V2 are separated from each other by the partition wall 23 of the housing main body 20 and the partition wall 46 of the lower cap 40 to form independent spaces, so that the valve chambers V1 and V2 do not communicate with each other.

Figure 6:
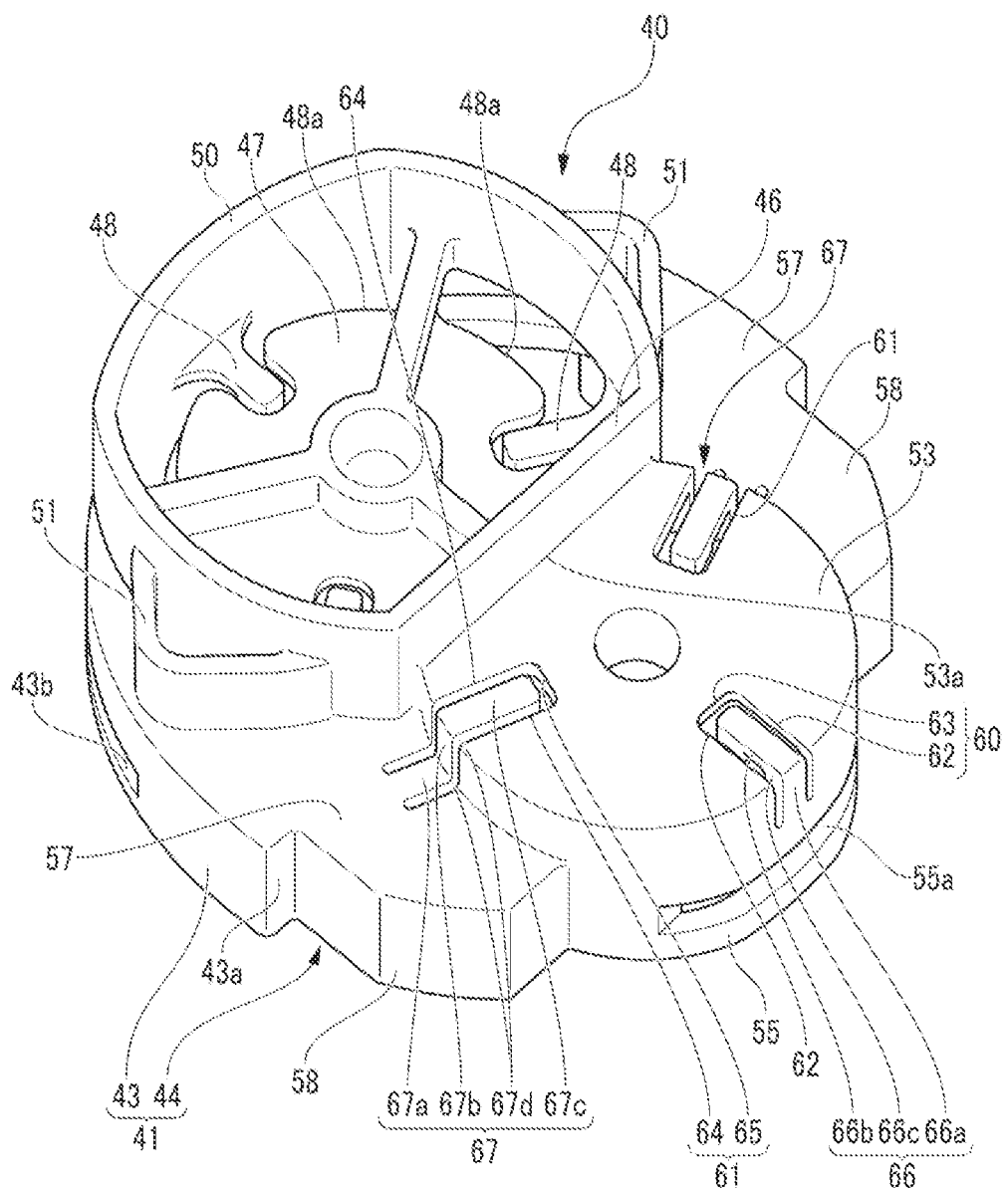
FIG. 6 is an enlarged perspective view of the lower cap when viewed from a direction different from that of FIG. 5.

As shown in FIG. 6, a tubular portion 50 having a large diameter and a pair of tubular portions 51 and 51 disposed on both sides of the tubular portion 50 and having a smaller diameter than the tubular portion 50 are vertically provided from a lower surface side of the first bottom wall 47. The tubular portion 50 has a substantially quadrangular tubular shape, each of the tubular portions 51 has a substantially triangular tubular shape, and the tubular portion 50 and the tubular portions 51 are opened at a lower side thereof. As shown in FIG. 5, tubular portions 52 and 52, each having a cylindrical shape, are vertically provided from positions aligned with the pair of tubular portions 51 and 51 at the upper surface side of the first bottom wall 47. The inside of the fuel tank and the inside of the first valve chamber V1 communicate with each other via the tubular portions 50, 51, and 52.

Figure 8:
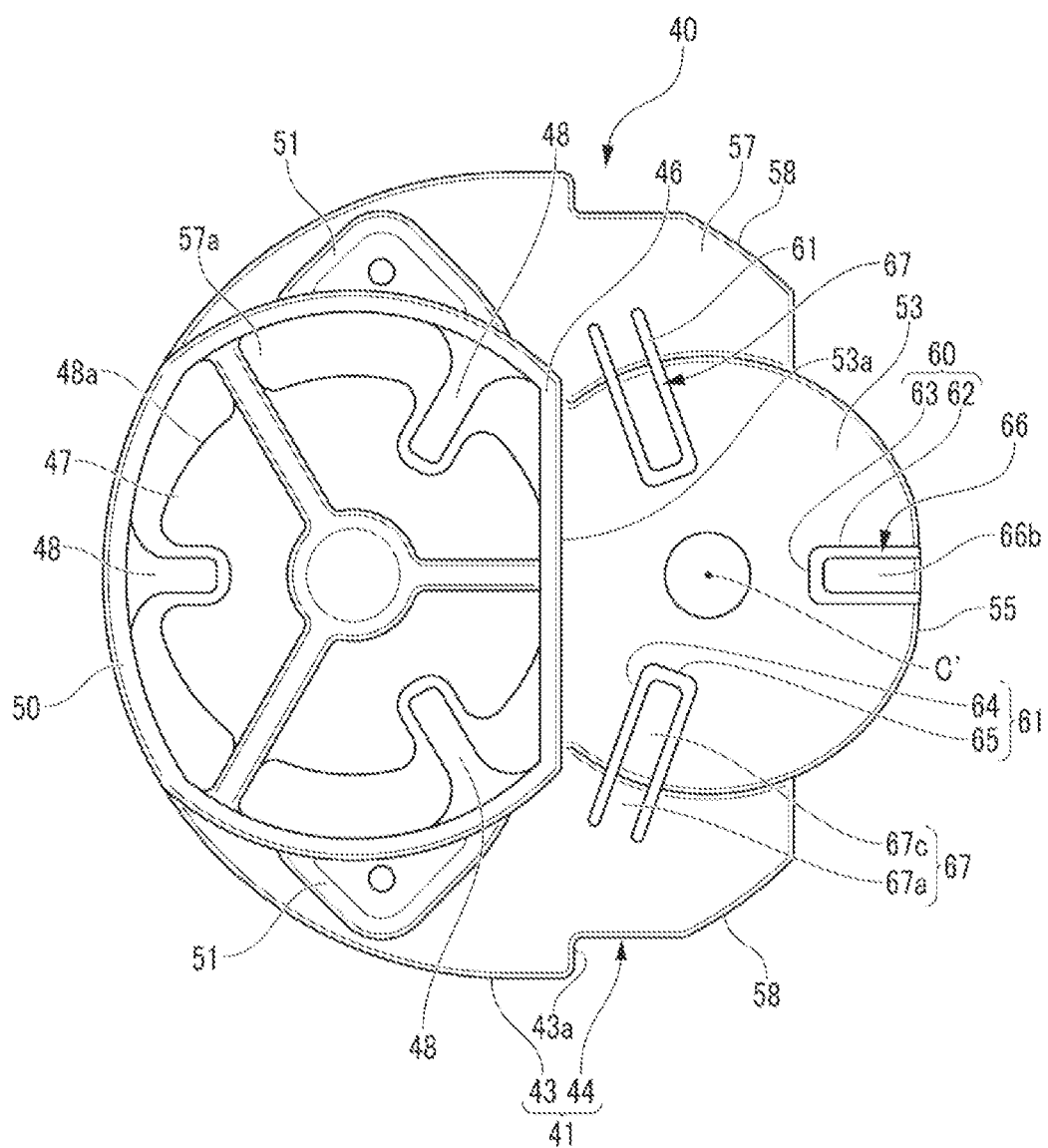
FIG. 8 is a bottom view of the lower cap.

As shown in FIGS. 7 and 8, a plurality of slits 48a are formed in the inner periphery of the first peripheral wall 4 of the first bottom wall 47, and a plurality of deflectable and deformable elastic pieces 48 are provided via the slits 48a. A float valve support portion 48b that has a protruded shape and that supports the first float valve 80 protrudes from an upper surface of a free end of each of the elastic pieces 48.

As shown in FIG. 5, a support shaft 49 having a cross sectional cross shape is vertically provided at a predetermined height from a center of an upper surface of the first bottom wall 47. As shown in FIG. 4, the support shaft 49 is inserted into a tubular portion 81a of the first float valve 80, and guides the ascending and descending movement of the first float valve 80.

As shown in FIG. 5, the second bottom wall 53 is disposed at a position lower than the first bottom wall 47, and has a substantially circular plate shape that is partially cut in a linear shape. As shown in FIG. 6, a linear portion 53a which is linearly cut is provided at a portion of the second bottom wall 53 adjacent to the partition wall 46.

An outer peripheral wall 55 is erected from a peripheral edge portion of the second bottom wall 53 facing the linear portion 53a (see FIGS. 5 and 6). The notch 55a notched and extending in a slit shape along the peripheral direction is formed at an upper side of the outer peripheral wall 55. As shown in FIG. 5, a pair of step forming peripheral walls 56 and 56 are erected from peripheral edge portions on both sides of the second bottom wall 53 in the peripheral direction (between the linear portion 54a and the outer peripheral wall 55) at a height lower than the outer peripheral wall 55. The peripheral walls 55 and 56 are erected perpendicularly with respect to the second bottom wall 53. The outer peripheral wall 55 is an example of a "peripheral wall" according to the present invention.

Figure 11:
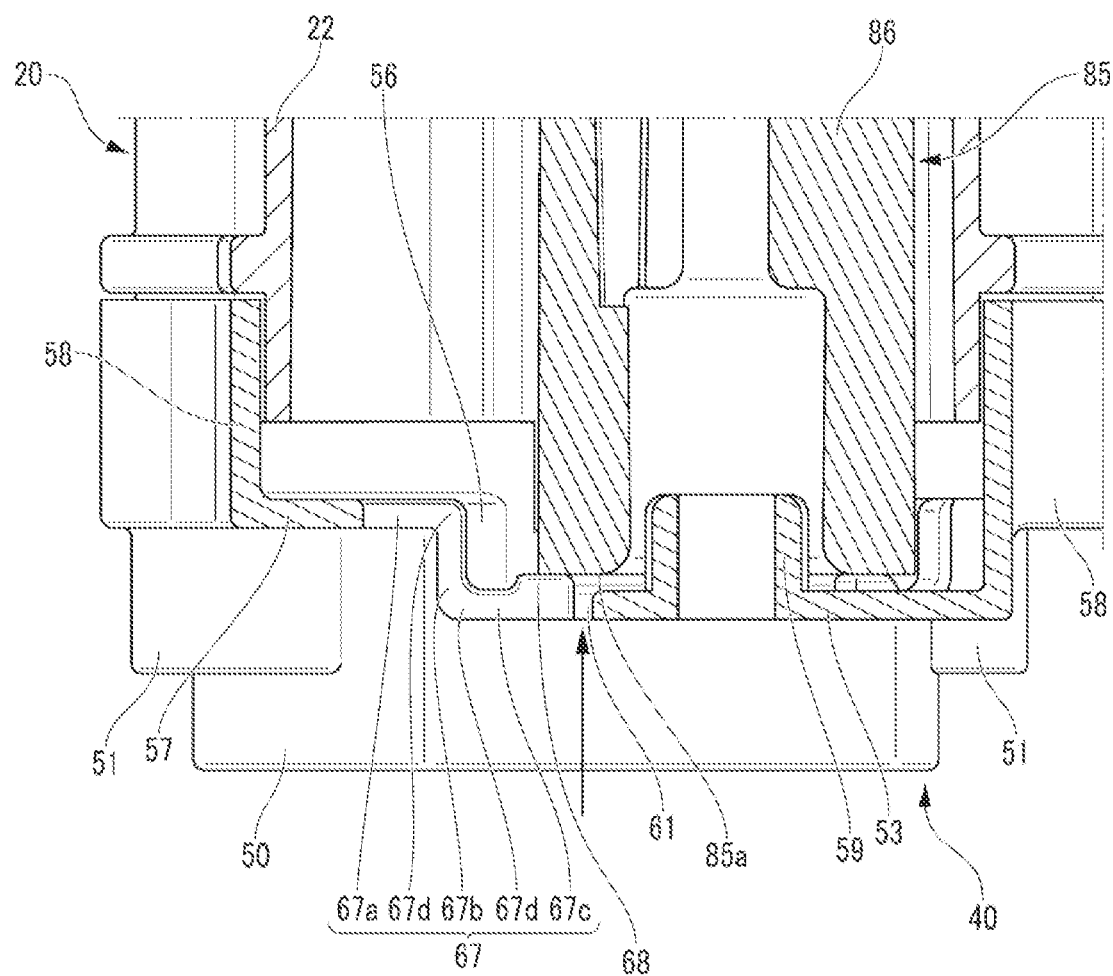
FIG. 11 is a cross-sectional view taken along an arrow line D-D in FIG. 3.

The lower cap 40 constituting the housing 15 further includes, at the outside of each step forming peripheral wall 56, the shelf-shaped wall 57 extending outward with respect to the second bottom wall 53 via a step. That is, the shelf-shaped walls 57 extending, in a shelf shape, outward with respect to the second bottom wall 53 in the radial direction extends from an upper end of the step forming peripheral wall 56 in an erecting direction as shown in FIG. 5, and a step is formed between the second bottom wall 53 and the shelf-shaped wall 57 via the step forming peripheral wall 56 as shown in FIG. 11. The step forming peripheral wall 56 is an example of the "peripheral wall" according to the present invention. The shelf-shaped wall 57 extends parallel to the second bottom wall 53 and is orthogonal to the step forming peripheral wall 56.

A projecting peripheral wall 58 having a shape conforming to the projecting wall portion 32 of the housing main body 20 is erected from the outer peripheral edge portion of each shelf-shaped wall 57. A spring seat 59 having a circular protrusion shape protrudes from the center of the second bottom wall 53 in the radial direction on the upper surface thereof (surface facing the second float valve 85). The spring seat 59 supports a lower end portion of the second biasing spring S2.

In the valve device 10, a slit extends continuously over a peripheral wall and a bottom wall, and a deflectable and deformable elastic piece is formed via the slit. As shown in FIGS. 5 to 7, two types of elastic pieces 66 and 67 are formed by two types of slits 60 and 61 in this embodiment. As shown in FIGS. 7 and 8, the slits 60 and 61 are arranged at equal intervals in the peripheral direction with respect to a center C' of the lower cap 40 in the radial direction.

First, the slit 60 and the elastic piece 66 formed via the slit 60 will be described.

As shown in FIGS. 5 and 6, the slit 60 extends continuously over the outer peripheral wall 55 and the second bottom wall 53. As shown in FIGS. 7 and 8, the slit 60 is disposed at the center of the outer peripheral wall 55 in the peripheral direction at a corresponding position of the second bottom wall 53. The slit 60 includes a pair of first slits 62 and 62, which extend in the axial direction of the lower cap 40 constituting the housing 15 on an outer peripheral wall 55 side and extend in the radial direction of the lower cap 40 on a second bottom wall 53 side, and a second slit 63 coupling end portions of the pair of first slits 62 and 62.

More specifically, the pair of first slits 62 are disposed at positions of the outer peripheral wall 55 where base end portions thereof are close to the notch 55a formed in the outer peripheral wall 55, extend along the axial direction from the base end portions toward the second bottom wall 53, and extend from distal end portions (lower end portions) in the extending direction inward with respect to the lower cap 40 in the radial direction (toward the center C' of the lower cap 40 in the radial direction shown in FIGS. 7 and 8) so as to be parallel to each other at the second bottom wall 53.

A cut portion (also referred to as a groove portion or a slit portion, and the same applies to the following description) of each of the first slits 62 on the outer peripheral wall 55 side and a cut portion on the second bottom wall 53 side are orthogonal to each other, and as a result, the first slit 62 has a substantially L shape (see FIGS. 5 and 6). The second slit 63 is orthogonal to the first slit 62, and couples distal end portions of the pair of first slits 62 and 62 in the extending direction. The cut portion of the slit 60 on the second bottom wall 53 side penetrates the second bottom wall 53 in a thickness direction, and the cut portion of the slit 60 on the outer peripheral wall 55 side penetrates the outer peripheral wall 55 in the radial direction, whereby the second valve chamber V2 in the lower cap 40 communicates with the outside of the lower cap 40.

As shown in FIG. 6, the end portion of the slit located on the peripheral wall side (base end portion of the second slit 62) and the notch 55a for attachment are arranged side by side in a valve axial direction. The "valve axial direction" according to the present invention means the axial direction of the float valves 80 and 85 (direction along the axial centers of the float valves 80 and 90) (the same applies to the following description).

The elastic piece 66 formed via the slit 60 has a so-called cantilever shape in which the end portion (base end portion) on the outer peripheral wall 55 side forms a fixed end portion coupled to the outer peripheral wall 55, and the end portion (distal end portion) on the second bottom wall 53 side forms a free end. As shown in FIGS. 5 and 6, the elastic piece 66 includes a peripheral wall side extension portion 66a extending on the outer peripheral wall 55 side, a bottom wall side extension portion 66b extending on the second bottom wall 53 side, and a bent portion 66c provided between the peripheral wall side extension portion 66a and the bottom wall side extension portion 66b. The bent portion 66c has a slightly rounded R shape.

Figure 10:
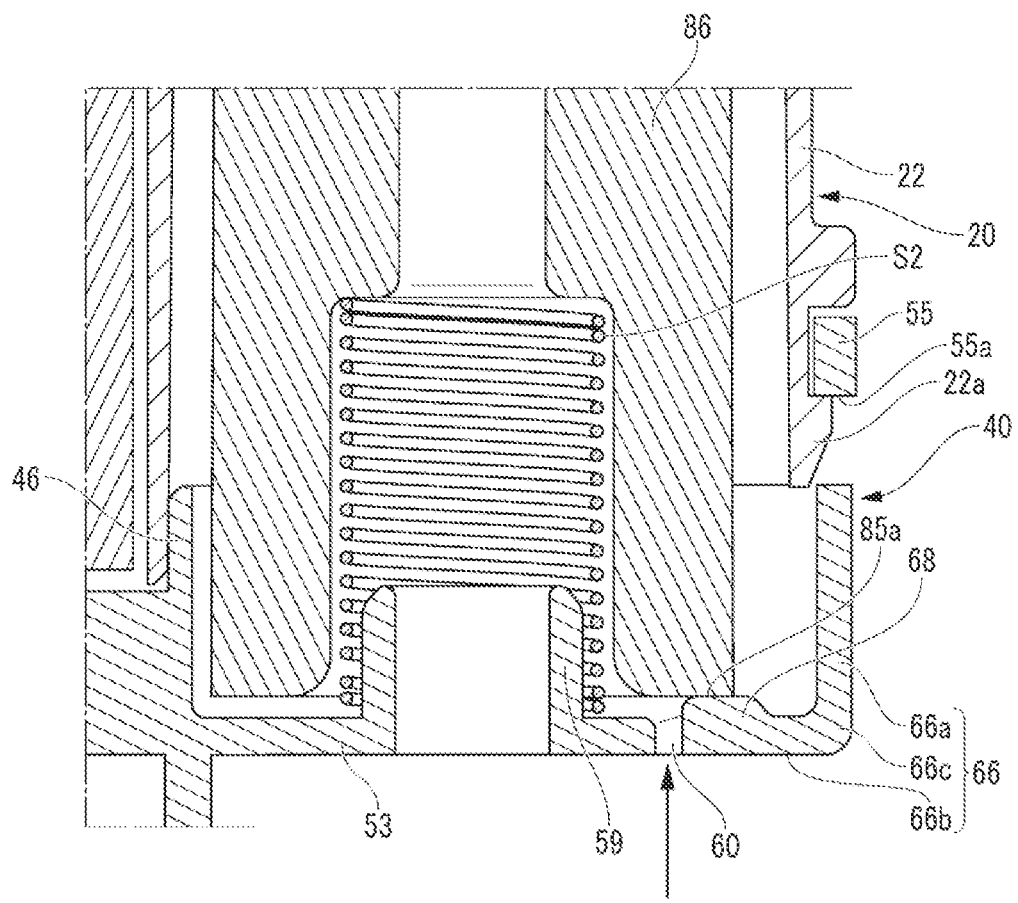
FIG. 10 is an enlarged cross-sectional view of a main part in FIG. 4.

With reference to FIG. 10, the peripheral wall side extension portion 66a extends along the axial direction of the lower cap 40, the bottom wall side extension portion 66b extends orthogonal to the axial direction of the lower cap 40 (extends horizontally along a plane direction of the second bottom wall 53), and the extension portions 66a and 66b are orthogonal to each other. As a result, the elastic piece 66 has a substantially L shape (see FIG. 10).

Next, the slit 61 and the elastic piece 67 formed via the slit 61 will be described.

The slit 61 extends continuously over the shelf-shaped wall 57, the step forming peripheral wall 56, and the second bottom wall 53. As shown in FIGS. 7 and 8, the pair of slits 61 and 61 are disposed at positions corresponding to the pair of shelf-shaped walls 57 and 57 on both sides of the second bottom wall 53 in the peripheral direction.

Each slit 61 includes a pair of first slits 64 and 64, which extend in the radial direction of the lower cap 40 on the shelf-shaped wall 57 side, extend in the axial direction of the lower cap 40 on the step forming peripheral wall 56 side, and further extend in the radial direction of the lower cap 40 on the second bottom wall 53 side, and a second slit 65 coupling end portions of the pair of first slits 64 and 64 to each other.

More specifically, the pair of first slits 64 each includes a base end portion located at a predetermined position of the shelf-shaped wall 57, extends inward in the radial direction of the lower cap 40 (toward the center C' of the lower cap 40 in the radial direction) from the base end portion at the shelf-shaped wall 57, extends along the axial direction from the distal end portion in the extending direction toward the second bottom wall 53 at the step forming peripheral wall 56, and the pair of first slits 64 further extend inward in the radial direction of the lower cap 40 from the distal end portion (lower end portion) in the extending direction at the second bottom wall 53 so as to be parallel to each other.

A cut portion of each of the first slits 64 on the shelf-shaped wall 57 side and a cut portion thereof on the step forming peripheral wall 56 side are orthogonal to each other, and the cut portion thereof on the step forming peripheral wall 56 side and the cut portion thereof on the second bottom wall 53 side are orthogonal to each other. As a result, the first slit 64 has a substantially stepped shape as shown in FIG. 6. The second slit 65 is orthogonal to the first slit 64, and couples distal end portions of the pair of first slits 64 and 64 in the extending direction. The slit 61 is such that the cut portion on the second bottom wall 53 side and the cut portion on the shelf-shaped wall 57 side penetrate the second bottom wall 53 and the shelf-shaped wall 57 in the thickness direction, and the cut portion on the step forming peripheral wall 56 side penetrates the step forming peripheral wall 56 in the radial direction, so that the second valve chamber V2 in the lower cap 40 communicates with the outside of the lower cap 40.

The elastic piece 67 formed via the slit 61 has a so-called cantilever shape in which the end portion (base end portion) thereof on the shelf-shaped wall 57 side forms a fixed end portion coupled to the shelf-shaped wall 57, and the end portion (distal end portion) thereof on the second bottom wall 53 side forms a free end. As shown in FIGS. 6 and 7, the elastic piece 67 includes a shelf-shaped wall side extension portion 67a extending on the shelf-shaped wall 57 side, a peripheral wall side extension portion 67b extending on the step forming peripheral wall 56 side, a bottom wall side extension portion 67c extending on the second bottom wall 53 side, and bent portions 67d, 67d respectively provided between the shelf-shaped wall side extension portion 67a and the peripheral wall side extension portion 67b, and between the peripheral wall side extension portion 67b and the bottom wall side extension portion 67c. The bent portion 67d has a slightly rounded R shape.

With reference to FIG. 11, the shelf-shaped wall side extension portion 67a extends orthogonal to the axial direction of the lower cap 40 (extends horizontally along the plane direction of the shelf-shaped wall 57), the peripheral wall side extension portion 67b extends along the axial direction of the lower cap 40, the bottom wall side extension portion 67c extends orthogonal to the axial direction of the lower cap 40 (extends horizontally along the plane direction of the second bottom wall 53), and the extension portions 67a and 67c are orthogonal to the extension portion 67b. As a result, the elastic piece 67 has a substantially stepped shape (see FIG. 11).

As shown in FIG. 9, when the housing 15 is viewed in the axial direction, a part of the pair of slits 61 and 61 and a part of the pair of elastic pieces 67 and 67 formed via the slits 61 and 61 are arranged at positions aligned with a pair of the flow paths 34 and 34 provided in the housing main body 20.

A float valve support portion 68 that supports the float valve is provided on a surface of each of the free ends of the elastic pieces 66 and 67 facing the float valve. Here, the float valve support portion 68 having a protruding shape protrudes from each upper surface (surface facing the bottom surface 85a of the second float valve 85) of the distal end portion of the bottom wall side extension portion 66b constituting the elastic piece 66 as shown in FIG. 10, and the distal end portion of the bottom wall side extension portion 67c constituting the elastic piece 67 as shown in FIG. 11, toward a second valve chamber V2 side formed in the housing. As shown in FIGS. 10 and 11, the float valve support portions 68 elastically contact the bottom surface 85a of the second float valve 85.

Figure 3:
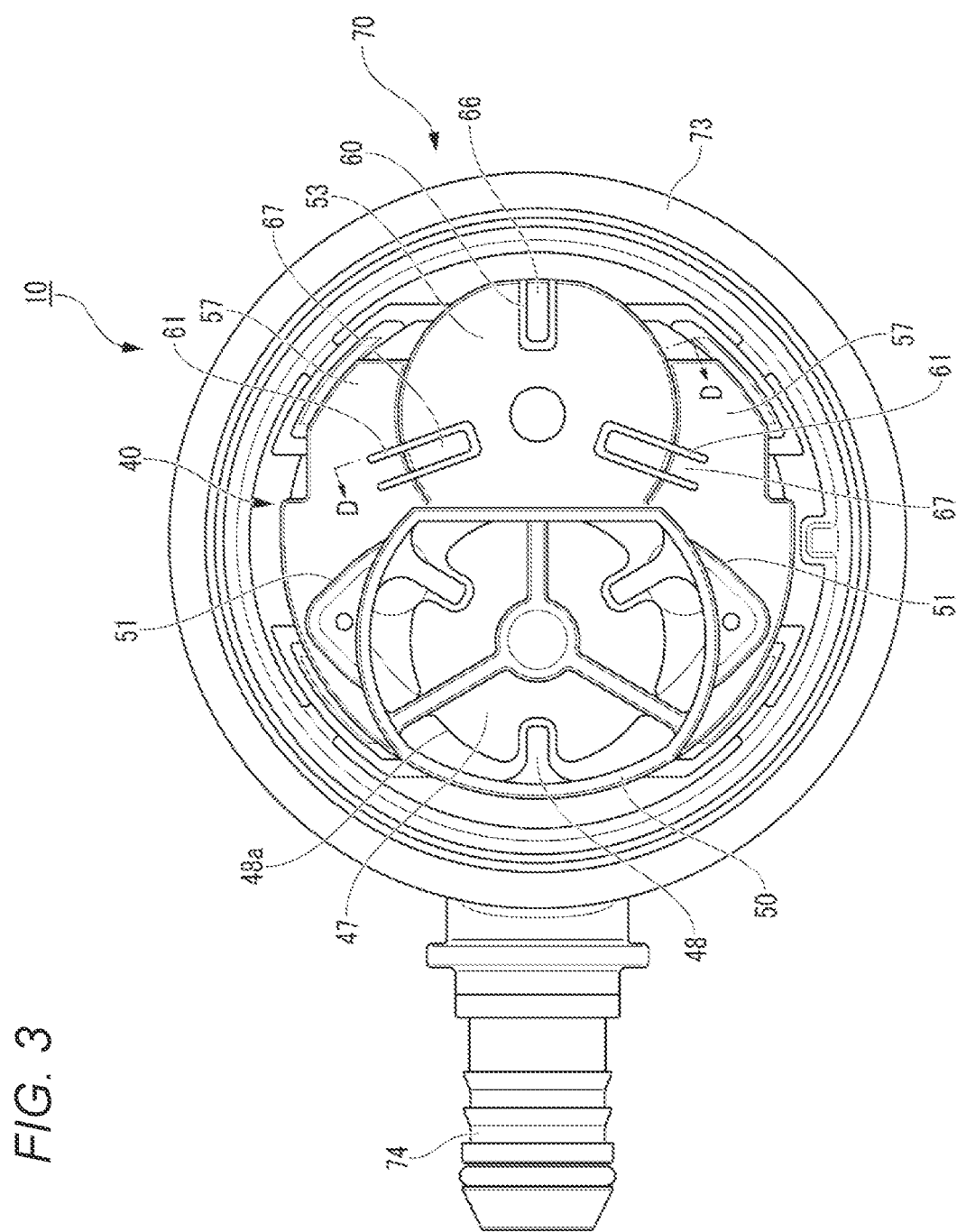
FIG. 3 is a bottom view of the valve device.

Next, the upper cover 70 attached above the housing main body 20 will be described with reference to FIGS. 1 and 3.

The upper cover 70 has a substantially hat shape and includes a peripheral wall 71 having a substantially circular outer periphery, a ceiling wall 72 disposed above the peripheral wall 71, and a flange portion 73 extending outward from a lower side of the peripheral wall 71. As shown in FIG. 4, a fuel vapor discharge port 74a is formed in the peripheral wall 71, and a fuel vapor discharge pipe 74 extends outward in the radial direction from a front side peripheral edge of the fuel vapor discharge port 74a. A vent tube coupled to a canister (not shown) is connected to the fuel vapor discharge pipe 74. The entire valve device 10 is attached to the fuel tank by welding the flange portion 73 of the upper cover 70 to a front side peripheral edge of an attachment hole (not shown) of the fuel tank.

As shown in FIG. 1, a plurality of engagement pieces 75 extend downward from predetermined positions of the flange portion 73 in the peripheral direction. Each of the engagement pieces 75 is formed with an engagement hole 75a with which the second engagement claw 22b provided at the housing main body 20 is engaged.

The second engagement claws 22b of the housing main body 20 are engaged with the corresponding engagement holes 75a of the engagement pieces 75 of the upper cover 70 as shown in FIG. 2, whereby the upper cover 70 is attached above the housing main body 20 in a state where the seal ring 28b attached in the ring attachment groove 28a abuts against with the inner periphery of the peripheral wall 71 of the upper cover 70 as shown in FIG. 4. As a result, the ventilation chamber R communicating with the outside of the fuel tank is formed above the partition wall 21 (see FIG. 4).

As shown in FIG. 4, the first float valve 80 that opens and closes the first opening portion 26 is accommodated and disposed in the first valve chamber V1 to be able to ascend and descend in a state where the first biasing spring S1 is interposed between the first float valve 80 and the lower cap 40. The second float valve 85 that opens and closes the second opening portion 27 is accommodated and disposed in the second valve chamber V2 to be able to ascend and descend in a state where the second biasing spring S2 is interposed between the second float valve 85 and the lower cap 40. The float valves 80 and 85 ascend by their own buoyancy and the biasing force of the biasing springs S1 and S2 when being immersed in the fuel, and descend by their own weight when not being immersed in the fuel.

As shown in FIGS. 1 and 4, the first float valve 80 according to this embodiment includes a float main body 81 having a circular outer periphery and generating buoyancy when being immersed in fuel, and a seal member 82 attached above the float main body 81, ascending and descending with respect to the float main body 81, and coming into contact with and separating from the first opening portion 26.

A seal valve body 83 made of an elastic material such as rubber or an elastic elastomer is attached above the seal member 82. A vent hole 83a with an opening at an upper side and a lower side penetrates through the center of the seal valve body 83 (see FIG. 4). The seal valve body 83 comes into contact with and separates from a back side peripheral edge portion of the first opening portion 26 to open and close the first opening portion 26, whereby the first float valve 80 functions as a full tank regulation valve.

An intermediate valve body 84 is supported between the float main body 81 and the seal member 82 in a tiltable manner (see FIG. 4). The intermediate valve body 84 normally abuts against a lower end portion of the seal valve body 83 to close the vent hole 83a (see FIG. 4), and opens the vent hole 83a when the float main body 81 descends with respect to the seal member 82.

The tubular portion 81a having a substantially cylindrical shape is vertically provided in the float main body 81. The support shaft 49 of the lower cap 40 is inserted into the tubular portion 81a, and the first float valve 80 is supported to be able to ascend and descend (see FIG. 4).

On the other hand, the second float valve 85 includes a float main body 86 having a circular outer periphery, and a valve head 87 protruding from an upper center thereof and having a substantially triangular pyramid shape with a rounded upper end. The valve head 87 comes into contact with and separates from a back side peripheral edge portion of the second opening portion 27 to open and close the second opening portion 27, whereby the second float valve 85 functions as a fuel-effusion suppression valve.

Shapes and structures of the housing, the housing main body, the lower cap, and the upper cover that constitute the housing, the float valve, and the like are not particularly limited. The housing may not have a three-component configuration including the housing main body, the lower cap, and the upper cover. The first float valve 80 according to this embodiment has a multi-component configuration including the float main body 81, the seal member 82, and the like, but the float valve may have, for example, a configuration in which a seal member made of an elastic material is attached on the upper side, and the shape and structure thereof are not particularly limited as long as the opening portion may be opened and closed.

In this embodiment, the structure includes two valve chambers (the first valve chamber V1 and the second valve chamber V2), two opening portions (the first opening portion 26 and the second opening portion 27), and two float valves (the first float valve 80 and the second float valve 85), but the present invention may be applied to a valve including one valve chamber, one opening portion, and one float valve, or a valve including three or more valve chambers, three or more opening portions, and three or more float valves.

The valve device 10 according to this embodiment includes two types of elastic pieces 66 and 67 having different shapes, and the elastic piece 67 is arranged more than the elastic piece 66, but only one or a plurality of elastic pieces 66 or elastic pieces 67 may be provided, or the elastic pieces 66 may be arranged more than the elastic pieces 67, and the number, arrangement, combination, and the like of the elastic pieces are not particularly limited. The elastic piece 66 has a substantially L shape, and the elastic piece 67 has a stepped shape having one step (step including the second bottom wall 53 and the shelf-shaped wall 57), but the elastic piece is not limited to such a shape. For example, the elastic piece may have a shape including a peripheral wall extending obliquely and a bottom wall extending horizontally, a shape including a peripheral wall extending vertically and a bottom wall extending obliquely, a shape in which the peripheral wall and the bottom wall extend obliquely, a shape extending over the peripheral wall and the bottom wall in a curved shape, a shape having two or more steps, or the like, and any shape or structure may be used as long as the slit continuously extends over at least the peripheral wall and the bottom wall, the elastic piece is formed to be deflectable and deformable via the slit, and the end portion on the bottom wall side is a free end.

(Operation and Effect)

Next, operations and effects of the valve device 10 according to the present invention configured as described above will be described.

As shown in FIG. 4, in a state where the fuel is not sufficiently filled into the fuel tank and the first float valve 80 and the second float valve 85 are not immersed in the fuel, both the float valves 80 and 85 descend by their own weights to open the first opening portion 26 and the second opening portion 27. Therefore, the first valve chamber V1 and the ventilation chamber R communicate with each other through the first opening portion 26, and the second valve chamber V2 and the ventilation chamber R communicate with each other through the second opening portion 27. The float valve support portions 48b of the plurality of elastic pieces 48 abut against the bottom surface of the first float valve 80 to support the first float valve 80, and the float valve support portions 68 of the elastic pieces 66 and 67 abut against the bottom surface 85a of the second float valve 85 to support the second float valve 85.

When the fuel is filled into the fuel tank in this state, air in the fuel tank mainly flows into the first valve chamber V1 from the slit 48a of the lower cap 40, flows upward through the gap between the first float valve 80 and the first valve chamber forming wall 24, flows into the ventilation chamber R from the first opening portion 26, and is discharged to the canister outside the fuel tank. The air in the fuel tank flows into the second valve chamber V2 from the slits 60 and 61 of the lower cap 40, flows upward through the flow paths 34 (see FIG. 9) and the like, flows into the ventilation chamber R from the second opening portion 27, and is discharged to the canister outside the fuel tank. In this way, the air in the fuel tank is discharged to the outside of the fuel tank, whereby the fuel may be filled into the fuel tank.

When the fuel is filled into the fuel tank from the state shown in FIG. 4, the fuel flows into the first valve chamber V1 from the slit 48a of the lower cap 40, and when the fuel level in the fuel tank reaches the set full-tank fuel level, the first float valve 80 ascends, and the seal valve body 83 abuts against the back side peripheral edge portion of the first opening portion 26 to close the opening portion. As a result, the air flow between the first valve chamber V1 and the ventilation chamber R through the first opening portion 26 is blocked, the fuel in the fuel tank rises in the fuel supply pipe provided in the fuel tank, the fuel comes into contact with a full-tank detection sensor for a fuel supply nozzle inserted into a fuel supply port to detect the full state, whereby the full tank regulation can be implemented.

When the vehicle turns a curve, runs on an uneven road, a slope, or the like, or falls down due to an accident in the state shown in FIG. 4, the fuel in the fuel tank swings intensely, and the fuel level increases, the second float valve 85 ascends due to the biasing force of the biasing spring S2 and the buoyancy of the second float valve 85, and the valve head 87 abuts against the inner peripheral edge portion of the second opening portion 27 to close the second opening portion 27. As a result, the fuel is suppressed from flowing into the ventilation chamber R through the second opening portion 27, thereby suppressing the fuel from leaking out of the fuel tank.

The second float valve 85 descends by the weight of the float valve in a state in which buoyancy is not generated due to, for example, subsiding of vibration of the fuel, the bottom surface 85a thereof is supported by the float valve support portions 68 provided on free end sides of the elastic pieces 66 and 67 (see FIGS. 10 and 11). When the second float valve 85 descends in this way, the float valve support portions 68 are pressed by the bottom surface 85a of the second float valve 85, and the elastic pieces 66 and 67 are elastically deformed toward the outer side of the lower cap via the fixed end portion, whereby the impact is absorbed, and the bottom surface 85a of the second float valve 85 elastically contacts the float valve support portions 68 of the elastic pieces 66 and 67. Therefore, it is possible to suppress an impact sound when the second float valve 85 is lowered.

In the valve device 10, the slit 60 forming the elastic piece 66 extends continuously over the outer peripheral wall 55 and the second bottom wall 53, and the slit 61 forming the elastic piece 67 extends continuously over the step forming peripheral wall 56 and the second bottom wall 53. Therefore, even when the slits 60 and 61 on the second bottom wall 53 side (cut portions of the first slits 62 and 64 on the second bottom wall 53 side) are shortened, the elastic pieces 66 and 67 can be formed to be long by elongating the slits 60 and 61 on the peripheral walls 55 and 56 side (cut portions of the first slits 62 and 64 on the peripheral walls 55 and 56 side). Therefore, the elastic pieces 66 and 67 can be easily deflected and deformed, and thus the impact sound suppression effect by the float valve support portions 68 when the second float valve 85 descends can be enhanced.

As described above, when the fuel is filled into the fuel tank, the fluid F such as air or fuel vapor in the fuel tank is blown up and flows into the second valve chamber V2 from the lower side of the housing 15 through the slits 60 and 61, as indicated by arrows in FIGS. 10 and 11. Even when the fuel vapor in the fuel tank increases due to traveling of the vehicle or the like, the fluid F as the fuel vapor is blown up and flows into the second valve chamber V2 from the lower side of the valve device 10 through the slits 60 and 61.

At this time, in the valve device 10, the slits 60 and 61 forming the elastic pieces 66 and 67 extend continuously over the peripheral walls 55 and 56 and the second bottom wall 53 as described above. Therefore, the slits 60 and 61 on the second bottom wall 53 side can be shortened while forming the elastic pieces 66 and 67 to be long. Therefore, the opening area of the slits 60 and 61 on the second bottom wall 53 side (cut portions of the first slits 62 and 64 on the second bottom wall 53 side) can be reduced. Accordingly, since the fluid F that blows up from the bottom wall side of the housing and pushes up the second float valve 85 from the bottom surface 85a side is less likely to pass through the slits 60 and 61 on the second bottom wall 53 side, it is possible to make the second float valve 85 less likely to float. As a result, when the flow rate of the fluid is a predetermined value or less, it is easy to set the second float valve 85 not to float, and to cause the second float valve 85 to function as a cut valve, an overfilling suppression valve, or the like.

In this embodiment, the elastic piece 66 includes the peripheral wall side extension portion 66a extending on the outer peripheral wall 55 side, the bottom wall side extension portion 66b extending on the second bottom wall 53 side, and the bent portion 66c provided between the peripheral wall side extension portion 66a and the bottom wall side extension portion 66b, and the elastic piece 67 includes the peripheral wall side extension portion 67b extending on the step forming peripheral wall 56 side, the bottom wall side extension portion 67c extending on the second bottom wall 53 side, and the bent portion 67d provided between the peripheral wall side extension portion 67b and the bottom wall side extension portion 67c, as shown in FIGS. 5 to 7.

According to the above aspect, appropriate rigidity can be provided by the bent portions 66c and 67d, and breaking or bending of the elastic pieces 66 and 67 can be suppressed while easily deflecting and deforming the elastic pieces 66 and 67.

In this embodiment, the slit 60 includes the pair of first slits 62 and 62 extending in the axial direction of the housing 15 (lower cap 40) on the outer peripheral wall 55 side and extending in the radial direction of the housing 15 on the second bottom wall 53 side, and the second slit 63 coupling end portions of the pair of first slits 62 and 62, as shown in FIGS. 5 and 6. The slit 61 includes the pair of first slits 64 and 64 extending in the axial direction of the housing 15 on the step forming peripheral wall 56 side and extending in the radial direction of the housing 15 on the second bottom wall 53 side, and the second slit 65 coupling end portions of the pair of first slits 64 and 64.

According to the above aspect, the opening area of the slit (first slits 62 and 64) in the second bottom wall 53 of the housing 15 (here, the lower cap 40) can be reduced than that of the arc-shaped split groove formed to extend in the peripheral direction on the surface portion of the case facing the bottom portion of the float body as in the valve device for a fuel tank of Patent Literature 1 while maintaining the deflection and deformation performance of the elastic pieces 66 and 67, and the second float valve 85 can be made even less likely to float.

In this embodiment, the housing 15 includes the housing main body 20 and the lower cap 40 attached below the housing main body 20 and provided with the second peripheral wall 44 and the second bottom wall 53, as shown in FIG. 1. The outer peripheral wall 55 of the second peripheral wall 44 is formed with the notch 55a used for attaching the housing main body 20 and the lower cap 40, the slit 60 extends continuously over the outer peripheral wall 55 and the second bottom wall 53, and the end portion of the slit 60 (base end portion of the second slit 62) located on the outer peripheral wall 55 side and the notch 55a for attachment are arranged side by side in the valve axial direction, as shown in FIGS. 5 and 6.

According to the above embodiment, since the base end portion of the second slit 62 located on the outer peripheral wall 55 side of the lower cap 40 and the notch 55a for attachment formed in the outer peripheral wall 55 of the lower cap 40 are arranged side by side in the valve axial direction, the elastic piece 66 formed via the slit 60 can be more easily deflected and deformed (the base end portion of the second slit 62 and the notch 55a are arranged side by side in the valve axial direction, whereby the base end portion of the elastic piece 67 is coupled to the vicinity of the portion where the notch portion 55a is formed and which is easily deformed in the outer peripheral wall 55), and the impact sound suppression effect may be further enhanced.

In this embodiment, the housing 15 (here, the lower cap 40) further includes the shelf-shaped wall 57 extending to the outside of the bottom wall (second bottom wall 53) via a step on the outside of the peripheral wall (step forming peripheral wall 56), and the slit 61 continuously extends over the shelf-shaped wall 57, the step forming peripheral wall 56, and the second bottom wall 53, as shown in FIG. 6.

According to the above aspect, since the slit 61 extends continuously over the shelf-shaped wall 57, the step forming peripheral wall 56, and the second bottom wall 53, even when the lower cap 40 includes the shelf-shaped wall 57, the elastic piece 67 can be formed to be long, and the elastic piece 67 can be easily deflected and deformed.

Further, the present invention is not limited to the above-described embodiments, and various modified embodiments are possible within the scope of the gist of the present invention, and such embodiments are also included in the scope of the present invention.

REFERENCE SIGNS LIST 10 valve device
15 housing
20 housing main body
21 partition wall
40 lower cap
44 second peripheral wall
53 second bottom wall (bottom wall)
55 outer peripheral wall
55a notch
56 step forming peripheral wall
57 shelf-shaped wall
60, 61 slit
62, 64 first slit
63, 65 second slit
66, 67 elastic piece
66a, 67b peripheral wall side extension portion
66b, 67c bottom wall side extension portion
66c, 67d bent portion
68 float valve support portion
70 upper cover
80 first float valve
85 second float valve (float valve)

The invention claimed is:

1. A valve device comprising:
a housing including a peripheral wall, a bottom wall, and a partition wall, in which a valve chamber configured to communicate with an inside of a fuel tank is provided at a lower side and a ventilation chamber configured to communicate with an outside of the fuel tank is provided at an upper side via the partition wall, and an opening portion configured to communicate with the valve chamber and the ventilation chamber is formed in the partition wall; and
a float valve accommodated in the valve chamber to be able to ascend and descend, thereby opening and closing the opening portion, wherein
a slit extends continuously over the peripheral wall and the bottom wall, and a deflectable and deformable elastic piece is formed via the slit, and
the elastic piece has a free end on the bottom wall, and the free end is provided with a float valve support portion configured to support the float valve.

2. The valve device according to claim 1, wherein the elastic piece includes a peripheral wall side extension portion extending on the peripheral wall, a bottom wall side extension portion extending on the bottom wall, and a bent portion provided between the peripheral wall side extension portion and the bottom wall side extension portion.

3. The valve device according to claim 1, wherein the slit includes a pair of first slits extending in an axial direction of the housing on the peripheral wall and extending in a radial direction of the housing on the bottom wall, and a second slit coupling end portions of the pair of first slits.

4. The valve device according to claim 1, wherein the housing includes a housing main body formed of a cylindrical body provided with the partition wall, and a lower cap attached to a lower side of the housing main body and provided with the peripheral wall and the bottom wall, the peripheral wall provided at the lower cap is formed with a notch used for attaching the housing main body and the lower cap, and the slit extends continuously over the peripheral wall and the bottom wall provided at the lower cap, and an end portion of the slit located on the peripheral wall and the notch for attachment are arranged side by side in a valve axial direction.

5. The valve device according to claim 1, wherein the housing further includes a shelf-shaped wall located outside the peripheral wall and extending outward with respect to the bottom wall via a step, and the slit continuously extends over the shelf-shaped wall, the peripheral wall, and the bottom wall.

* * * * *